April 8, 1952  W. R. WHITLOCK  2,591,751
WHIRLING ROUGHING AND FINISHING CUTTERHEAD
MACHINE FOR DEBARKING LOGS AND THE LIKE
Filed Aug. 4, 1948  7 Sheets-Sheet 1

Fig. 1.

William R. Whitlock
INVENTOR.

Fig. 4.

William R. Whitlock
INVENTOR.

April 8, 1952    W. R. WHITLOCK    2,591,751
WHIRLING ROUGHING AND FINISHING CUTTERHEAD
MACHINE FOR DEBARKING LOGS AND THE LIKE
Filed Aug. 4, 1948    7 Sheets-Sheet 7

William R. Whitlock
INVENTOR.

BY
Attorneys

Patented Apr. 8, 1952

2,591,751

UNITED STATES PATENT OFFICE 2,591,751

WHIRLING ROUGHING AND FINISHING CUTTERHEAD MACHINE FOR DEBARKING LOGS AND THE LIKE

William R. Whitlock, Aberdeen, Wash., assignor of one-third to Clark W. Adams, Aberdeen, Wash.

Application August 4, 1948, Serial No. 42,506

14 Claims. (Cl. 144—208)

My invention relates to improvements in whirling roughing - and - finishing cutter - head machines for debarking logs, poles, piles and the like.

The primary object of the invention is to provide a machine of this class adapted for high speed operation to remove the bark and knots off logs, and the like, without taking off any appreciable amount of wood, and to thereby dress the logs for painting or otherwise treating to preserve the same, while saving lumber in the dressing operation.

Another object is to provide a machine of the character above set forth adapted to debark, without appreciable loss of wood, logs with crooked sweeps, or bends, therein; and without binding of the legs in the machine, jamming of the machine, or slowing down of machine operations.

Still another object is to provide a whirling cutter-head machine for debarking logs of any taper and of different sizes, irregular or otherwise, without altering the taper or descreasing the size of the log below the bark in a manner to waste lumber.

Still another object is to provide a whirling cutter-head machine for the purposes set forth in which the cutter heads are arranged for swinging while whirling to engage a log, the machine embodying means for swinging the cutter heads, said heads being controlled at will by means of a stationarily mounted control.

Still another object is to provide such a whirling cutter-head machine with depth cutting gages engaging the log and whirling with the cutter heads and being variably adjustable, while whirling, by stationarily mounted control means.

Still another object is to provide a machine of the class and for the purposes above specified which is portable easily and quickly on a truck, or the like, for changing the location thereof, comparatively simple in construction, easy to control and service, and inexpensive to manufacture and operate.

Other and subordinate objects, within the purview of my invention, together with the precise nature of my improvements will be readily understood when the succeeding description and claims are read with reference to the drawings accompanying and forming part of this specification.

Referring to the drawings by numerals, the machine of my invention comprises a main, skeleton frame 1 of elongated rectangular shape with front and rear side beams 2, 3, end beams 4, 5, suitably arranged cross connecting beams, as at 6, also a longitudinal beam 7, and an internal end rest frame 8 for a purpose presently explained. The main frame is preferably constructed of structural steel.

Figure 3:
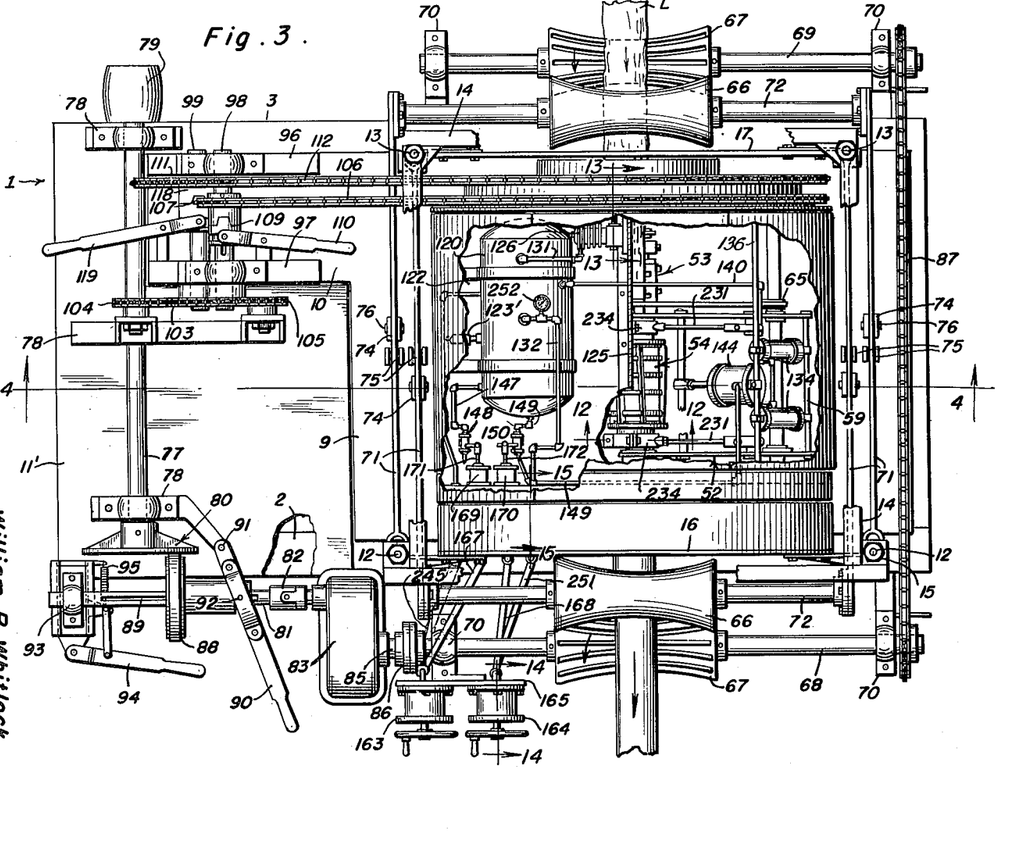
Figure 3 is a view in plan, partly broken away, and partly in section.

An elevator platform 9 surmounts the main frame 1 in parallel relation thereto and extends substantially from the front to the rear sides thereof, there being a lateral extension 10 at the left rear corner of said frame 1 (as viewed in Figure 3). A pair of longitudinal I-beams 11 underlying the elevator platform 9 at one side thereof brace the extension 10. The elevator platform 9 when fully lowered is adapted to rest on the skeleton frame 1 with the I-beams 11 and extension 10 resting on the rest frame 8. A deck plate 11' on the skeleton frame 1, at the same end as the extension 10, fits along said extension when said platform 9 is in a position of rest and serves a purpose presently explained.

The elevator platform 9 is mounted for vertical adjustment by means of the following. Front and rear side pairs of posts 12, 13 for guiding the elevator platform 9 vertically rise from the front and rear side beams 2, 3 between the end extension 10 and the opposite end of said elevator platform 9 and are arranged in square formation and connected at the upper ends thereof by a rectangular channel iron frame 14 bolted to said posts, as at 15. A pair of front and rear side cheek plates 16, 17 of rectangular form upstanding from opposite sides of the elevator platform 9, between the end extension 10 and the opposite end of said platform are secured to said platform in any suitable manner to form part thereof and are provided with upper and lower corner guides 18, 19 bolted, as at 20, to said plates and slidably fitting on said guide posts 12, 13. Bottom channel irons 21 connect said cheek plates 16, 17 and platform 9. The front and rear side cheek plates 16, 17 are provided with central, horizontally aligned, tubular front and rear throats 22, 23 of sufficient diameter to pass large logs, or poles, therethrough to cutter heads, presently described, and the front cheek plate 16 is provided on the inside face thereof with an annular flange 24 relatively larger than the front throat 22 and concentric to said throat, all for a purpose to be explained.

Pneumatic means are provided for elevating the elevator platform 9 comprising a pair of front and rear pneumatic jacks 25, 26 in the vertical center of the cheek plates 16, 17 and the transverse center of said platform 9, said jacks having the usual pistons 27, 28 bolted, as at 29, to bottom outstanding channel members 30, 31 on said cheek plates 16, 17, respectively. A pressure supply line 32 from a suitable source of air under pressure, not shown, extends to the front jack 25 with an upstanding loop 33 at the front side of the main frame 1 having interposed therein a pressure gage 34 and a jack control valve 35. The jacks 25, 26 are cross connected by a pressure line 36 for operation in unison.

Figure 5:
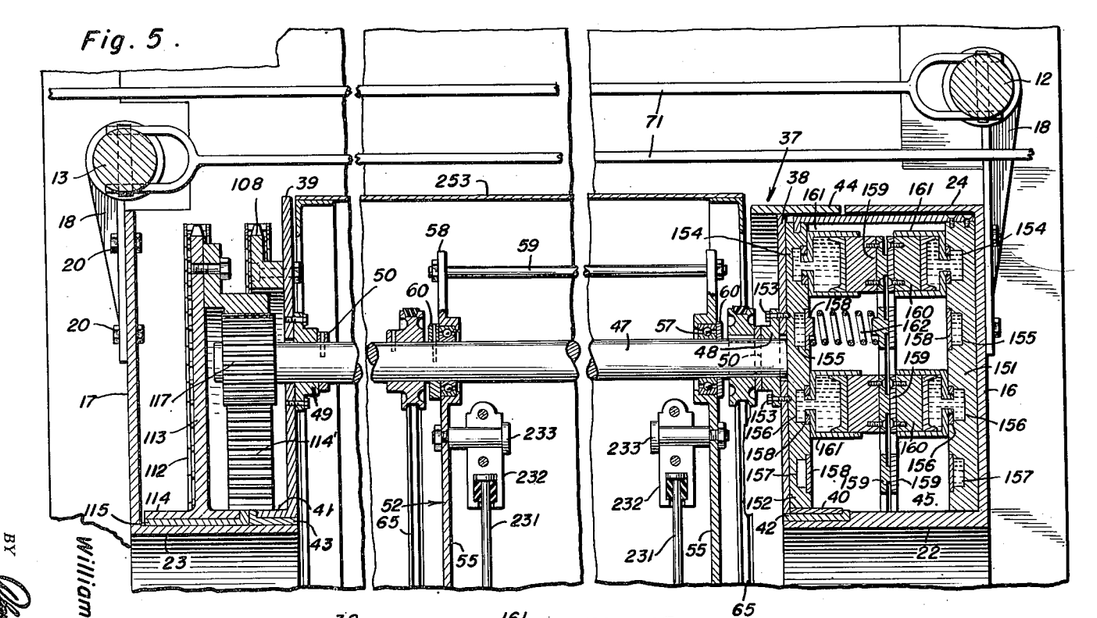
Figure 5 is a fragmentary view in horizontal section and shows part of a rotatable annular cutter-head carrier and part of a mechanism for transferring fluid pressure between stationary and revolving annular members for controlling certain valves, etc. the section being taken on the line 5—5 of Figure 1 and partly broken away, but drawn to a still larger scale.

Intermediate the front and rear side cheek plates 16, 17 is a rotary annular cutter head carrier 37 shown in detail, in part, in Figure 5, and which comprises a pair of front and rear, annular, side carrier members 38, 39 with hubs 40, 41 journalled on bushings 42, 43 on the front and rear throats 22, 23, whereby said carrier 37 is rotatable concentrically around the axis of said throats 22, 23, and on the elevator platform 9. The front carrier member 38 is provided with a circumferential, lateral flange 44 opposite the beforementioned annular flange 24 and forming therewith an annular, substantially closed, chamber 45 around the front throat 22, the purpose of which is later explained. A pair of horizontal, cutter head driving shafts 46, 47 connect the front and rear carrier members 38, 39 together for rotation in unison, said shafts being journalled at diametrically opposite sides of the carrier 37 in bearings, as at 48, 49 on said carrier members 38, 39. Collars, as at 50, on said shafts 46, 47 space said carrier members 38, 39 apart. The cutter head driving shafts 46, 47 extend through the rear carrier member 39 for a purpose presently seen.

A pair of duplicate, roughing and finishing cutter head carrying frames 51, 52 are mounted at relatively opposite, outer, ends thereof for vertical swinging movement on the cutter head driving shafts 46, 47 with cylindrical roughing and finishing cutter heads 53, 54, presently described, rotatably mounted in the inner ends of said frames upon diametrically opposite sides of the cutter head carrier 37 and for swinging by said frames into and from engagement with diametrically opposite sides of a log L fed longitudinally through the front and rear throats 22, 23 and through said carrier 37. The cutter head carrying frames 51, 52 are staggered axially of the machine, so that the incoming, or oncoming, log L is attached first by the roughing cutter head 53 and next by the finishing cutter head 54. As will be understood, the cutter heads 53, 54 are adapted to be rotated about axes parallel to the axis of rotation of the cutter head carrier 37, and while being revolved with said frames 51, 52 by rotation of said carrier 37.

Figure 6:
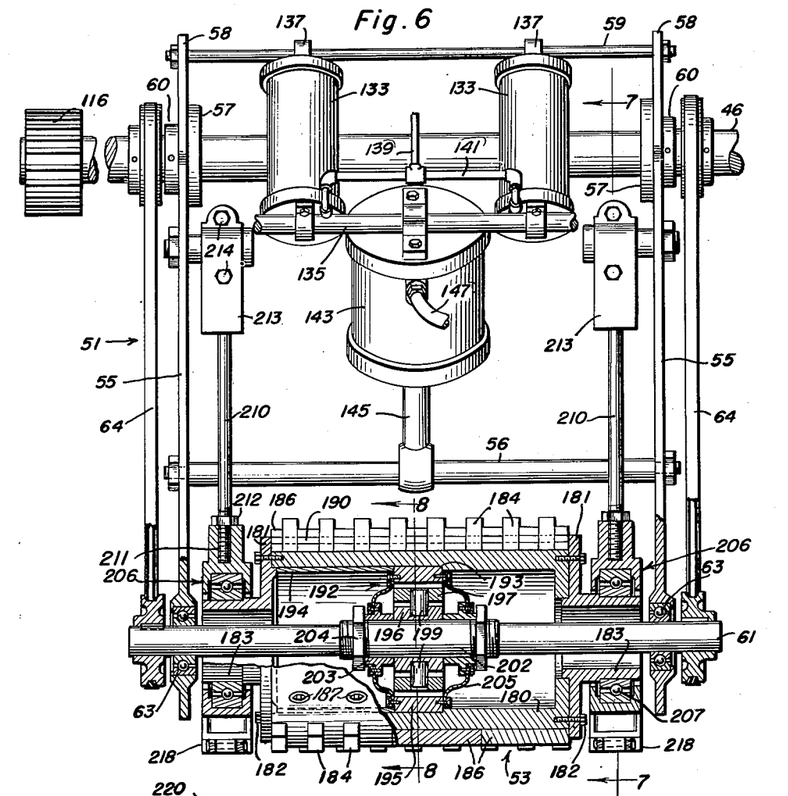
Figure 6 is a fragmentary view partly in longitudinal section, of a carrying frame for the revolving cutters, as seen when looking upwardly along the irregular line 6—6 of Figure 4, the view being drawn to a larger scale.

Referring now especially to Figure 6, each of the cutter head carrying frames 51, 52 comprises a pair of side bars 55 tied together by a front cross rod 56, said bars 55 being swingably mounted adjacent rear ends thereof on antifriction bearings 57 on the cutter head driving shafts 46, 47, as the case may be. The side bars 55 terminate in rear end crank arms 58 connected by a rear cross tie-rod 59. Collars 60 fast on the cutter head driving shafts 46, or 47, as the case may be, prevent lateral play of said bars 55 on the cutter head driving shafts. Cutter head carrying shafts 61, 62 are journalled in anti-friction bearings 63 in the front ends of said bars 55 of the cutter head carrying frames 51, 52 and are driven to rotate the cutter heads 53, 54, in a manner presently clear, by means of belt and pulley drives 64 from the cutter head driving shaft 46 to the cutter head carrying shaft 61, and similar drives, as at 65, from the cutter head driving shaft 47 to the cutter head carrying shaft 62.

Pairs of upper and lower, concave, log-feeding rollers 66, 67 are provided at the front and rear sides of the machine, the axes being horizontal and parallel, and the axes of either the upper or lower pair of rollers lying in a horizontal plane, one plane being above and the other plane being below the axis of rotation of the cutter head carrier 37 and the axis of the throats 22, 23. The lower log-feeding rollers 67 of the pairs are corrugated and driven and fastened upon horizontal shafts 68, 69 parallel with and alongside the front and rear side cheek plates 16, 17 and having ends journalled in bearing brackets 70 outstanding from the side beams 2, 3 of the main frame 1. The upper log-feeding rollers 66 of the pairs are adapted to ride on a log L fed between the pairs and to maintain the cutter head carrier 37 concentric to the log L regardless of sweeps, or bends, in said log and variations in diameter thereof, and whereby to maintain the roughing and finishing cutter heads 53, 54 working around the log concentrically at all times after setting to cut to a predetermined depth, all in a manner presently more clearly described. To this end, the upper log-feeding rollers 66 of the pairs operate platform elevating and lowering mechanism now to be described.

The elevating and lowering, or adjusting, mechanism for the elevator platform 9 comprises horizontal levers 71 extending in pairs at substantially diametrically opposite sides of the cutter head carrier 37 across the machine, the upper log-feeding rollers 66 being mounted on shafts 72 journalled between front ends of the pairs of levers 71, and the pairs of levers 71 being pivoted at rear ends thereof, as at 73, on the guide posts 12, 13 at the sides of the machine opposite from said rollers. Pairs of upright links 74 upon diametrically opposite sides of the cutter head carrier 37 are pivoted at lower ends thereof, as at 75, to the elevator platform 9 with upper ends pivoted, as at 76, to the levers 71 on corresponding sides of said carrier, the arrangement being such that as the upper log-feeding rollers 66 follow sweeps, or bends, in the log L, the levers 71 are swung vertically in pairs to raise or lower the elevator platform 9, and hence the cutter head carrier 37 so as to maintain said carrier concentric to the log L.

Driving mechanism for the lower log-feeding rollers 67 comprises the following.

A main drive shaft 77 for the machine extends across the end of the main frame 1 at which the extension 10 of the elevator platform 9 is located, and is journalled in suitable bearing brackets 78 on the deck 11' with a belt pulley 79 thereon for connection to any suitable source of power, not shown. One end of the main drive shaft 77 is operatively connected, by a variable speed friction clutch 80, to a jack shaft 81 extending along the front side of the machine and having one end connected by a universal joint 82 to a conventional speed reducing unit 83 mounted on a support 84 with a low speed shaft 85 connected by an overload slip clutch 86 to one end of the shaft 68 for the lower log-feeding roller 67 at the front side of the machine. The opposite end of said shaft 68 is connected by a sprocket and chain connection 87 to the corresponding end of the shaft 69 for the log-feeding roller 67 at the rear side of the machine. The driven element 88 of the clutch 80 is splined on the jack shaft 81, as at 89, for shifting for variable speed control by a clutch shift lever 90 pivoted on a bearing bracket 78, as at 91, and operatively connected to said member 88, as at 92. A slidable bearing 93 for the end of the jack shaft 81, opposite the universally jointed end, provides for swinging said jack shaft laterally to disengage the driven clutch element 88 and thereby disengage said clutch 80. A clutch disengaging lever 94 is operatively connected in any suitable manner to said bearing 93 for sliding the same in opposition to a suitably arranged spring 95 yieldingly holding the clutch 80 engaged.

The main drive shaft 77 drives the cutter head carrier 37 by means of the following speed-reducing drive means. Journalled in a pair of laterally spaced bearing brackets 96, 97 rising from the extension 10 of the elevator platform 9 is a pair of upper and lower sprocket wheel shafts 98, 99 having fastened on corresponding ends thereof relatively large and small sprocket wheels 100, 101. A sprocket chain 103 is trained around a still smaller sprocket wheel 102 on the main drive shaft 77, then upwardly over a similar idler sprocket wheel 104 on one bearing bracket 78, said chain being looped from said wheel 104 downwardly under the sprocket wheel 101, then trained upwardly over the sprocket wheel 100 and then trained around an idler sprocket wheel 105 on the bearing bracket 78, and back to said sprocket wheel 102. As will be seen, this arrangement of drive means provides a vertically floating driving connection which compensates for raising and lowering of the elevator platform 9 relative to the stationarily mounted main drive shaft 77. Thus a constant drive is provided for the cutter head carrier 37 notwithstanding raising and lowering of said carrier by the elevator platform 9. A sprocket chain 106 extends from a sprocket wheel 107, loose on the upper sprocket wheel shaft 98, said chain being trained around a ring sprocket wheel 108 fastened on the rear carrier member 39 concentrically thereof and surrounding the cutter head drive shafts 46, 47. A suitable clutch 109 with a clutch shift lever 110 is provided on said shaft 98 for clutching the sprocket wheel 107 to said shaft 98.

The main drive shaft 77 also drives the cutter head drive shafts 46, 47 through the described sprocket and chain connections to the lower sprocket wheel shaft 99, and by means of a sprocket wheel 111 loose on said shaft 99 and connected by a sprocket chain 112 to a relatively larger sprocket wheel 113 having a hub 114 journalled on a bushing 115 on the rear throat 23. A ring gear 114' on the sprocket wheel 113 meshes with a pair of spur gears 116, 117 fastened on the beforementioned extended ends of the cutter head drive shafts 46, 47. A clutch 118 and clutch shift lever 119 provides for clutching said sprocket wheel 111 to the shaft 99.

As will now be seen, and as indicated by the arrows in Figure 3, the lower log-feeding rollers 67 of the pairs are driven to rotate at a comparatively slow speed and feed a log L through the throats 23, 22 and the cutter head carrier 37 longitudinally and horizontally from the rear side of the machine to the front side of said machine. The cutter head carrier 37 is driven at a comparatively slow speed by the described drive means to rotate in a clockwise direction, as viewed from the front side of the machine, and as indicated by the arrow in Figure 4, and such rotation of said carrier revolves the roughing and finishing cutter heads 53, 54 around the log L at slow speed. The sprocket wheel 113 and ring gear 114' are rotated reversely relative to the cutter head carrier 37 and at a slow speed, by the described drive, and the ring gear 114' and spur gears 116, 117 impart high speed rotation to the cutter drive driving shafts 46, 47 in a counter-clockwise direction, as indicated by the arrows in Figure 4, to similarly rotate the roughing and finishing cutter heads 53, 44 through the belts 64, 65 as said heads revolve clockwise. As will be clear, high speed rotation of the cutter head driving shafts 46, 47 is augmented by revolving of the spur gears 116, 117 around the ring gear 114' under rotation of the cutter head carrier 37.

Pneumatic means, rendered operative under hydraulic controls, is provided for swinging the cutter head carrying frames 51, 52 to advance and retract the same toward and from the axis of the cutter head carrier 37, and the log L, to engage and disengage the roughing and finishing cutter heads 53, 54 with the log L, and such means will now be described.

Figure 4:
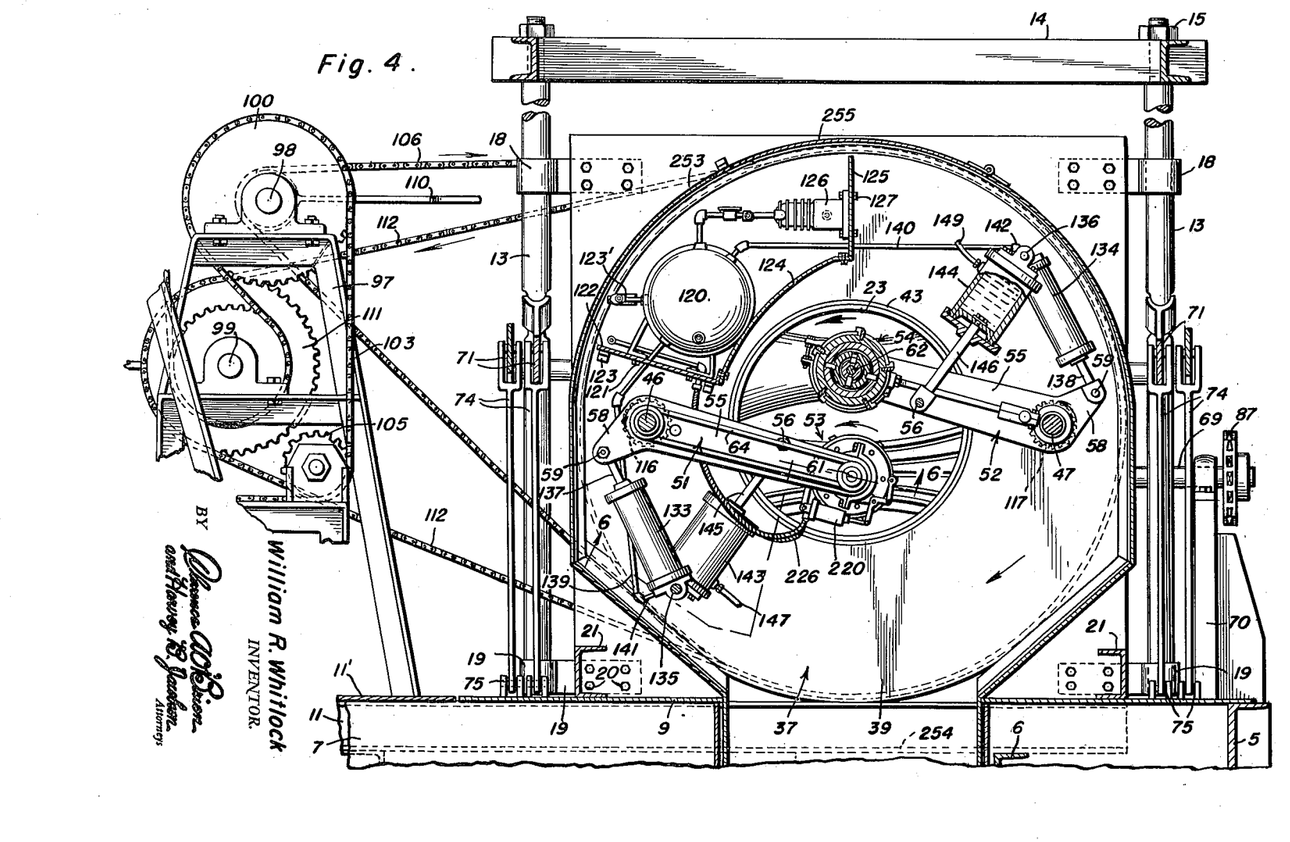
Figure 4 is a fragmentary view in vertical transverse section taken on the line 4—4 of Figure 3 and drawn to a larger scale.

A compressed air storage tank 120, see Figures 3 and 4, is suitably bolted, as at 121, on a shelf 122 suitably fixed at 123 in the cutter head carrier 37 so that said tank and said carrier move as a unit. The shelf 122 embodies a removable plate 124 for access to the storage tank 120, and said shelf also embodies an extension plate 125 radial to said carrier 37 and serving a purpose presently apparent. A conventional safety valve 123' is provided on the storage tank 120.

Figure 13:
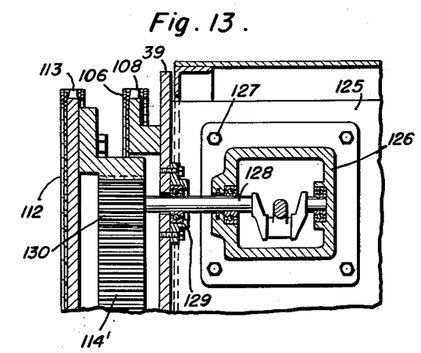
Figure 13 is a fragmentary detail view of a gear operated air-compressor, the view being taken in vertical longitudinal section on the line 13—13 of Figure 3, but drawn to a larger scale.

A conventional, reciprocating type, air-compressor 126, see Figures 3, 4 and 13, is bolted, as at 127, to the extension plate 125, and comprises a crank shaft 128 extending through a bearing 129 in the rear carrier member 39, said shaft having a spur gear 130 fastened thereon and meshing with (and driven by) the ring gear 114' to operate said compressor as the cutter head carrier 37 rotates and said compressor moves therewith. A pressure supply line 131 extends between the air compressor 126 and said tank 120. A pressure gage line 132 extends from said tank 120 in a manner and for a purpose later explained.

Pneumatic retracting cylinders, see Figures 3, 4, 6, are pivoted in side-by-side pairs 133, 134 on cross rods 135, 136, fixed in the cutter head carrier 37 and traversing the roughing and finishing cutter head carrying frames 51, 52, the pairs of cylinders 133, 134 having plunger rods 137, 138 pivotally connected to the tie-rods 59 of said carrying frames 51, 52, so that pressure in said pairs of cylinders 133, 134 retracts said carrier frames 51, 52 to disengage the roughing and finishing cutter heads 53, 54 from the log L. Constantly open pressure supply lines 139, 140 extend from the storage tank 120 to constantly open cross connecting pair lines 141, 142 for the pairs of pneumatic cylinders 133, 134, so that said carrying frames 51, 52 are normally retracted to disengage the roughing and finishing cutter heads 53, 54 and maintain the same out of the path of travel of a log.

Pneumatic advancing cylinders 143, 144 with plunger rods 145, 146 are provided for the roughing and finishing cutter head carrying frames 51, 52, respectively, the cylinders 143, 144 being pivoted on the cross rods 135, 136 with the plunger rods 145, 146 pivotally connected to the cross rods 56 of said frames, so that pressure in said cylinders 143, 144 advances said carrying frames 51, 52 to engage the roughing and finishing cutter heads 53, 54 with the log L. For a reason presently seen, the air capacity of each advancing cylinder 143, 144 is greater than that of each pair of retracting cylinders 133, 134. A pressure supply line 147 extends from the storage tank 120 to the advancing cylinder 143 with an air supply control valve 148 interposed therein of any suitable lever operated type adapted when closed to bleed the line so as to exhaust the air in said cylinder 143. As will be understood, the pressure supply line 147 from the valve 148 to the cylinder 143 is flexible. A similar pressure supply line 149 extends from said tank 120 to the advancing cylinder 144 with a similar air supply control valve 150 therein, said line from the valve 150 to the cylinder 144 being flexible also.

The air supply control valves 148, 150 form part of hydraulic control means for the pneumatic means for advancing said cutter heads 53, 54, the remainder of the hydraulic control means being described in the following with particular reference to Figures 1, 3, 5 and 14. Within the beforementioned chamber 45 is a pair of annular, flat, fluid-containing members longitudinally spaced apart in opposite relation and one of which, designated 151, fits around the front throat 22 and is suitably fixed to the front said cheek plate 16 so as to be held stationary, the other of said members designated 152 being similarly fixed, as by bolts 153, to the front carrier member 38 to rotate with the cutter head carrier 37.

In the described fixed and rotary fluid-containing members 151, 152 confronting annular grooves are provided to form opposed pairs 154, 155, 156, 157, all of which will be identified at this point for convenience in description. Closure rings 158 in said grooves 154 to 157 close the grooves. Flat ring members 159 are opposed in wipingly engaging pairs in the chamber 45, each pair being shiftable as a unit along the axis of the throat 22. The pairs of ring members 159 are arranged opposite and intermediate the pairs of grooves 154 to 157 and are fixed between pairs of plungers 160 working in pressure cylinders 161 arranged in opposed pairs in said chamber 45 with the cylinders of the pair being connected to the closure rings 158 so that one cylinder 161 of each pair is held stationary by the fixed fluid-containing member 151 while the other cylinder of the pair is rotatable with the rotary fluid containing member 152. The cylinders 161 communicate with the pairs of grooves 154 to 157, as the case may be, and are grouped around the fixed and rotary fluid-containing members 151, 152 and in the chamber 45 in angular relation, as shown in dotted lines in Figure 1. Suitable coil springs 162 yieldingly back the rotary ring members 159 for a purpose presently clear. As will now be seen, the ring members 159, plungers 160 and pressure cylinders 161 form pressure transferring means for transferring pressure between the pairs of grooves 154 to 157 while the rotary fluid-containing member 152 is rotating. This for the reason that the pressure transferring means is stationary in part and rotary in part as will readily be apparent.

The grooves 155, 156 and the pressure cylinders 161 therebetween contain oil and form part of the hydraulic control means for the pneumatic means. The other grooves 154, 157 and the pressure cylinders 161 therebetween form parts of other controls later described.

Figure 14:
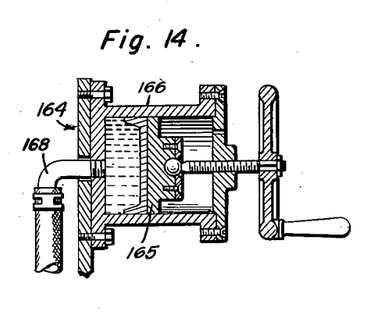
Figure 14 is a fragmentary detail view of one of three manual controls for effecting hydraulic pressure on the stationary side of the pressure-transfer mechanism, the view being taken on the line 14—14 of Figure 3.

Continuing now with the hydraulic control means, a pair of stationarily mounted, manual controls 163, 164, see Figures 1, 2, 3 and 14, are suitably fixed on a control panel 165 suitably mounted at the front side of the machine to one side of the path of travel of the log L, and one of which is shown in detail in Figure 14. These controls 163, 164 comprise hand wheel-operated plungers, as at 165, working in hydraulic pressure cylinders 166 connected by pipe lines 167, 168 to the grooves 155, 156 in the fixed fluid-containing member 151. The grooves 155, 156 of the rotary fluid-containing member 152 are suitably connected to plunger-containing hydraulic cylinders 169, 170, see Figure 3, fixed in any suitable manner on the rotary fluid-containing member 152 with the plungers 171, 172 thereof operatively connected to the valves 148, 150 to open said valves under hydraulic pressure in said cylinders 169, 170. Suitable means, such as springs, not shown, in said cylinders 169, 170 may be provided for operating the plungers of said cylinders 169, 170 to yieldingly maintain said valves 148, 150 closed.

Referring now to the operation of the described hydraulic control means, by operation of the manual controls 163, 164 to move the plungers 165 thereof in the proper direction, hydraulic pressure is effected in the grooves 155, 156 of the fixed fluid-containing member 151, the described appropriate ring members 159, plungers 160 and hydraulic cylinders 161, forming the pressure transferring means, operating to effect hydraulic pressure in the grooves 155, 156 of the rotary fluid containing member 152 which pressure operates the plungers 171, 172 of the hydraulic cylinders 169, 170 to open the valves 148, 150 to admit pneumatic pressure from the storage tank 120 to the advancing cylinders 143, 144 whereby to advance the roughing and finishing cutter heads 53, 54 against the log L while the cutter head carrier 37 is rotating and the parts carried thereby are revolving. As will be clear, each advancing cylinder 143, 144 having more than twice the air capacity of each pair of retracting cylinders 133, 134, the roughing and finishing cutter heads 53, 54 are advanced by overcoming the pressure in the pairs of retracting cylinders 133, 134. When hydraulic pressure is relieved by operation of the manual controls 163, 164 to move the plungers 165, in the opposite direction, hydraulic pressure is relieved in the grooves 155, 156 of the fixed and rotary fluid-containing members 151, 152, so that hydraulic pressure is relieved in the hydraulic cylinders 169, 170 and the valves 148, 149 are permitted to close by return of the plungers 171, 172, in a manner already indicated, said valves 148, 150 bleeding the pressure supply lines 147, 149 between said valves and the advancing cylinders 143, 144 to relieve pressure in said cylinders, whereupon the retracting cylinders 133, 134 will become effective to retract said cutter heads 53, 54.

The roughing cutter head, see Figures 6, 7, 8 and 11, comprises a cylinder 180 with annular heads 181 bolted thereto, as at 182, and provided with annular hubs 183. The cutter head carrying shaft 61 for the roughing cutter head 53 extends through said cylinder 180 and hubs 183. Substantially rectangular teeth 184 with beveled working ends 185 are fixed radically on said cylinder 180 in longitudinally-extending rows spaced equidistantly around said cylinder, and by means of segmental keeper plates 186 preferably arranged in series spaced longitudinally of the cylinder 180 and bolted to said cylinder, as at 187. The keeper plates 186 have edge notches, as at 188, see Figure 11, straddling said teeth 184 and are also provided with edge key-ways 189 for receiving keys 190 also received in key-ways 191 in said teeth. After the keeper plates 186 are bolted in place with the notches 188 straddling the teeth 184, the keys 190 may be driven into said key-ways 189, 191. The heads 181 may then be bolted in place, and, as will be seen, overlap the ends of the keys 190 to hold said keys in place.

The cylinder 180 of the roughing cutter head 52 is mounted on the cutter head carrying shaft 61 by a gimbal 192 having an outer ring 195, presently described, retained against an internal shoulder 193 in said cylinder 180 by a bushing 194 held in place in the cylinder 180 by one head 181. The outer ring of the gimbal is thus fixed in the cylinder 180 at its central transverse axis. The gimbal 192 comprises the before-mentioned outer ring 195, an inner ring 196 and an intermediate ring 197. The outer ring 195 is pivoted, by a pair of diametrically opposite studs 198, on the intermediate ring 197 which is similarly pivoted by a pair of diametrically opposite studs 199 on the inner ring 196, the studs 199 being coplanar with the studs 198 but in 90° angular relation thereto. The outer ring 195 is keyed, as at 200, to the cylinder 180, and the inner ring 196 is keyed, as at 201, on an enlargement 202 on said shaft 61. Bushings 203 on said enlargement 202 and nuts 204 on said enlargement retain the inner ring 196 against slipping sidewise. Dust caps 205 are secured to the bushings 203 and to the outer ring 195. As will be seen, the described gimbal 192 provides for universal rocking, or oscillation, of the roughing cutter head 53 laterally on the cutter head carrying shaft 61 to compensate for uneven places and sweeps, or bends, in the log L. The teeth 184 are designed to break up bark and knots on the log L and brush the same off said log.

Equalizing means is provided for the roughing cutter head 53 tending to yieldingly maintain the same parallel with the cutter head carrying shaft 61. The equalizing means comprises a pair of ball-bearing housings 206 surrounding the hubs 183 of the cylinder 180 and in which said hubs are rotatable on ball bearings 207. The housings 206 are formed in half sections 208 bolted together, as at 209. Equalizing rods 210 are threaded, at corresponding ends thereof, through lock nuts 212 and into said housings 206, as at 211, and extend from said housings 206 along the side bars 55 of the roughing cutter head carrying frame 51, the other ends of the rods being endwise slidable and being rotatably oscillatable in two-part dash pots 213, the parts of the dash pots being bolted together, as at 214, to swing about horizontal axes on studs 215 extending inwardly from said side bars 55. Heads 216 on the equalizing rods 210, slidable against rubber cushions 217 in said dash pots 213, tend to check endwise movement of said rods 210 in a manner to yieldingly oppose rocking or oscillation of the cylinder 180, which is to say the roughing cutter head 53, relative to the cutter head carrying shaft 61.

Arcuate, roughing cutter head, depth gage shoes 218 are provided at opposite ends of the roughing cutter head 53 to ride the log L and predetermine the depth at which the teeth 184 shall operate in brushing off the bark and breaking the same up by cutting into the bark. The depth gage shoes 218 are pivoted at one end thereof, as at 219, to the housings 206 for vertical swinging adjustment, so as to permit variations of the distance between said shoes and the axis of the roughing cutter head 53 and thus to variably predetermine the depth at which the teeth 184 shall work or cut.

Figure 7:
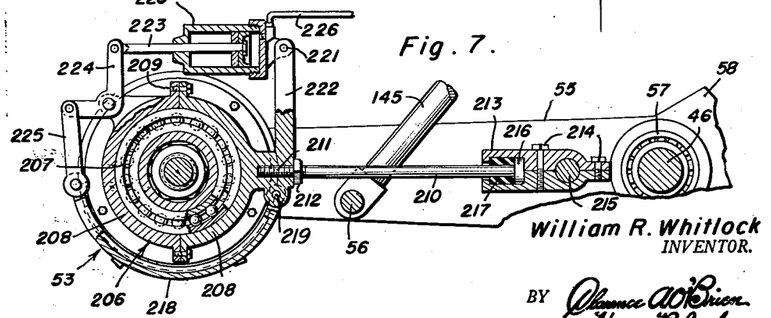
Figure 7 is a fragmentary view in transverse section and shows the roughing cutter and one of the pneumatically adjusted shoes which gage the depth of the cut, the section being taken on the line 7—7 of Figure 6.
Figure 8:
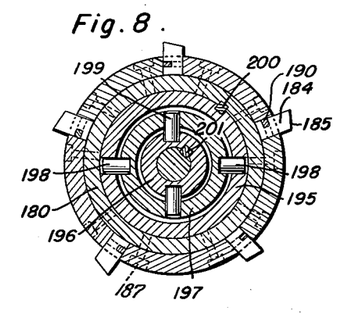
Figure 8 is a view in transverse section of the roughing cutter and its gimbal mounting, as taken on the line 8—8 of Figure 6.
Figure 9:
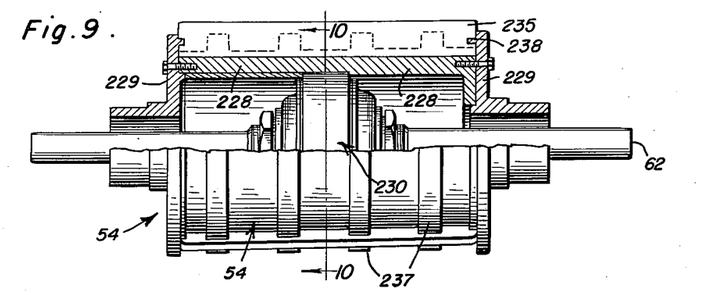
Figure 9 is a view partly in side elevation and partly in longitudinally section of the finishing cutter head drawn to the same scale as Figures 6, 7 and 8.
Figure 10:
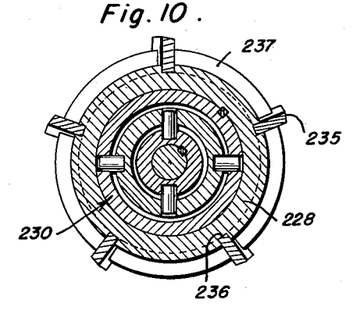
Figure 10 is a view in transverse section of the finishing cutter and its gimbal mounting, as taken on the line 10—10 of Figure 9.
Figure 11:
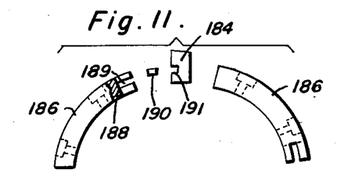
Figure 11 is a composite view in side elevation of one of the teeth of the roughing cutter head, the keeper plates and the key associated with said teeth.

Hydraulic means, see Figures 4 and 7, are provided for setting the depth gage shoes 218 and comprises a pair of hydraulic cylinders 220 (one of which is shown in Figure 7) pivoted, as at 221, on posts 222 on the housings 206 and having plungers 223 therein operatively connected to bell cranks 224 on said housings and which are connected, in turn, by pivoted links 225 to the free ends of said shoes 218. As will be seen, the arrangement is such that hydraulic pressure in the hydraulic cylinders 220 will thrust said shoes 218 against the log L to move the roughing cutter head 53 away from the log, in opposition to the force exerted by the advancing cylinder 143. The beforementioned grooves 154 in the fixed and rotary fluid containing members 151, 152, together with the pressure cylinders 161 and plungers 160 between said grooves, form part of hydraulic control means for said shoes 218, said grooves 154 and cylinders 161 containing oil, and the groove 154 in the rotary fluid-containing member 152 being connected by a common pressure fluid supply line 226 to the hydraulic cylinders 220, being branched to said cylinders 220 (as shown in Figure 4) and being flexible in part as shown.

A stationarily mounted manual control 227 on the control panel 165, like the manual controls 163, 164 provides for effecting hydraulic pressure in the groove 154 of the fixed fluid-containing member 151 transferred, in a manner which will now be manifest, to the groove 154 in the rotary fluid containing member 152 so that hydraulic pressure is effected in the hydraulic cylinders 220 to set the depth gaging shoes 218 to vary the depth at which the teeth 184 will cut, or brush. The manual control 227 is connected to the appropriate groove 154 in the same manner as the manual controls 163, 164, the connection line being designated 245 in Figure 3.

The finishing cutter head 54, see Figures 4, 9, 10, 12, comprises a cylinder 228 with cylinder heads 229 and a gimbal 230, all as described with reference to the roughing cutter head 53, and said finishing cutter head 54 is provided with equalizing means, like that described with reference to the roughing cutter head 53. The equalizing rods 231, dash pots 232 and studs 233 of the equalizing means for the finishing cutter head 54 are shown in Figure 5 and together with the ball-bearing housings 234 therefor are shown in Figure 3. Longitudinal, spiral cutting blades 235 on said cylinder 228 are set into grooves 236 and notched circumferential ribs 237 on said cylinder 228. The heads 229 overlap the ends of said blades 235 and have annular keys 238 thereon fitting in notches 239 in the ends of said blades 235 to retain said blades in place.

Figure 1:
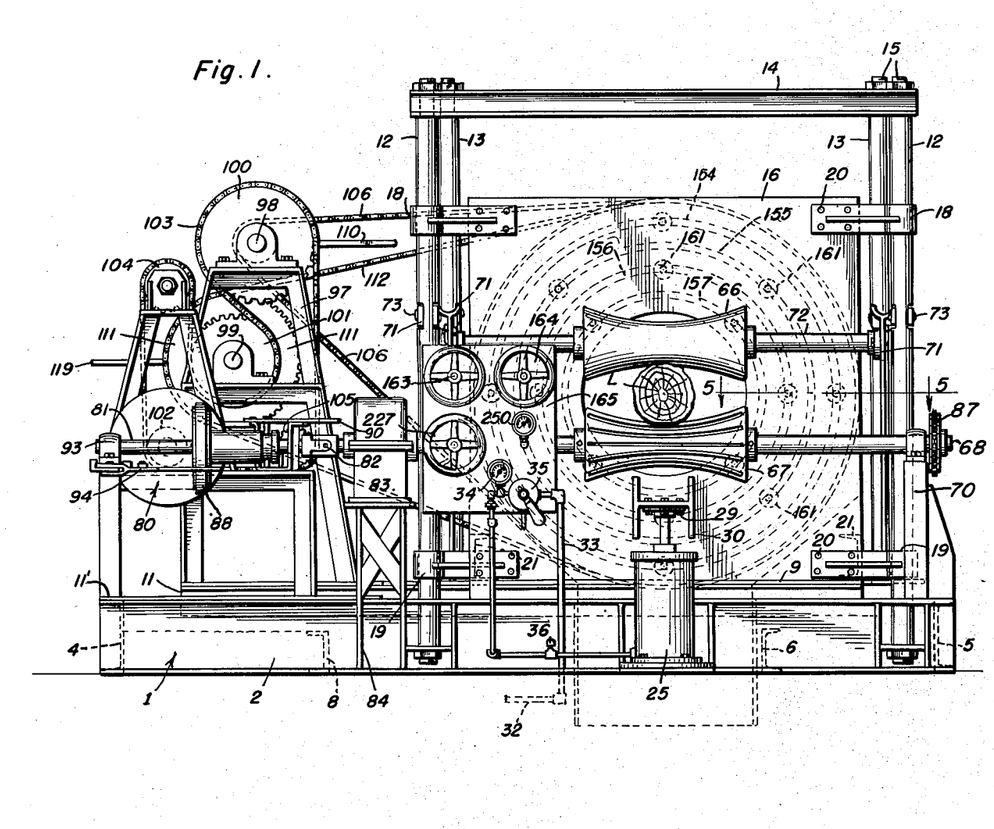
Figure 1 is a view in front elevation of my improved machine, in the preferred embodiment thereof.
Figures 2, 12:
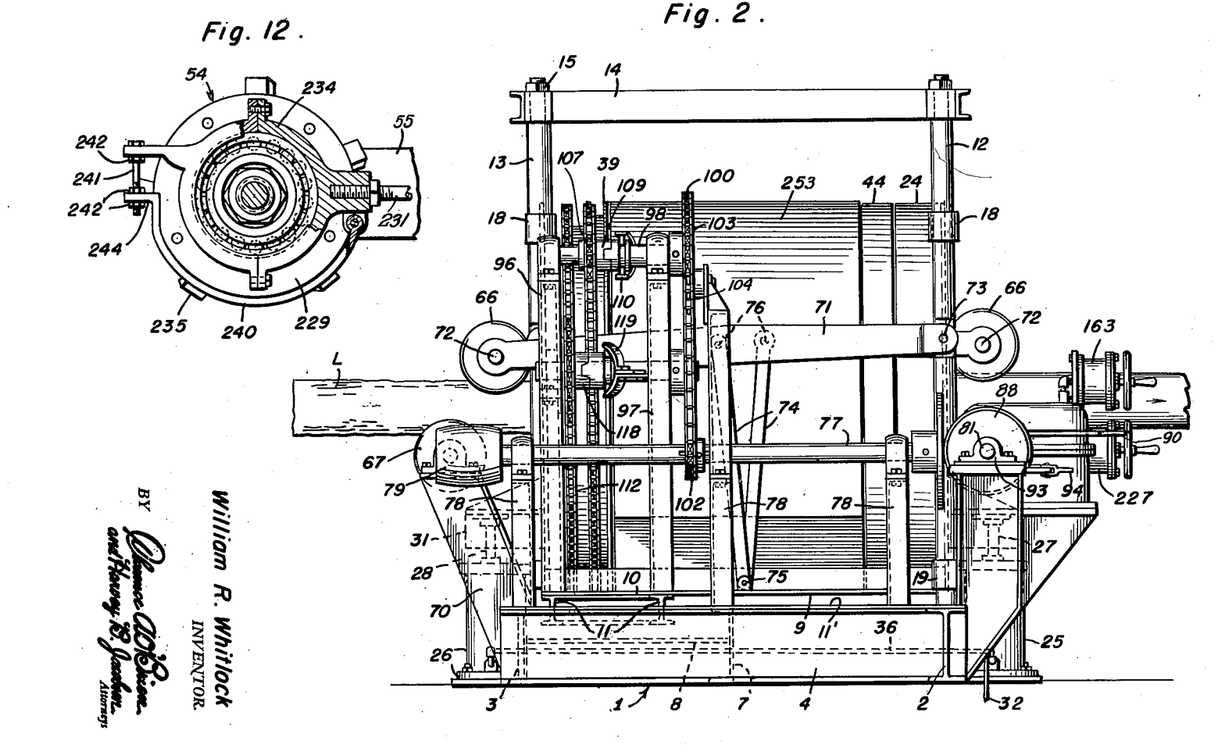
Figure 2 is a view in end elevation, as seen from the left in Figure 1.
Figure 12 is a fragmentary detail view in vertical transverse section, and shows the finishing cutter and one of its manually adjustable shoes which gage the depth of the cut, the section being taken on the line 12—12 of Figure 3, but drawn to a larger scale.

The finishing cutter head 54 acts as a planer to dress the log L and is prevented from cutting too deeply into the log by depth gage shoes 240 on the ends of the cylinder 228. The depth gage shoes 240, see Figure 12, are arcuate like the depth gage shoes 218 and are pivoted to the housings 234 of the equalizing means so as to ride on the log L and so as to swing vertically for adjustment like the shoes 218. However, in the instance of the depth gage shoes 240 for the finishing cutter head 54, said shoes are manually adjustable (for presetting of said shoes 240) by bolts 241 and nuts 242, the bolts 241 extending through ears 243 on said housings 234, and through ears 244 on the free ends of said shoes 240.

Figure 15:
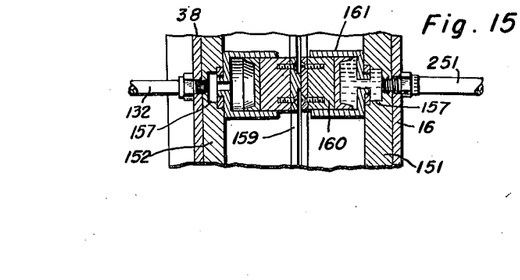
Figure 15 is a fragmentary detail view and shows that part of the pressure-transfer mechanism which transforms air-pressure in an interior revolving storage tank to hydraulic pressure in an exterior stationary recording gage, the view being taken in longitudinal section on the line 15—15 of Figure 3, but drawn to a larger scale.

A pressure gage 250 for the storage tank 120 is provided on the control panel 165 and is connected by a pressure line 251 (see Figures 3 and 15) to the groove 157 in the fixed fluid-containing member 151. The beforementioned pressure gage line 132 extends from the storage tank 120 to the other groove 157 of the pair, in the rotary fluid-containing member 152. Air pressure from the storage tank 120 results in air pressure in the groove 157 to which said line 132 is connected and such pressure is transferred, in a manner which will now be understood, to the other groove 157 of the pair which is filled with oil to operate the pressure gage 250 by hydraulic pressure. A checking pressure gage 252 is provided in the line 132 alongside the storage tank 120.

A suitable, open-sided, stationary hood 253 covers the roughing and finishing cutter heads 53, 54 and the other parts that move with the cutter head carrier 37 and is provided with a bottom drop 254 for discharging cuttings through the main frame 1 to the ground, or into a pit, not shown. The hood 253 is provided with an access door 255.

The following will, when taken in conjunction with the foregoing, suffice to describe the operation of the machine. The log L is fed to the log-feeding rollers 66, 67 at the rear side of the machine by crawlers, of the usual type, not shown, and taken from the log-feeding rollers 66, 67 at the front side of the machine by similar means. The lower log-feeding rollers 67 of the pairs 66, 67 being driven, in a manner already described, the log is fed longitudinally through the cutter head carrier 37. The elevator platform 9 is elevated by means of the pneumatic jacks 25, 26 to spread the pairs of log-feeding rollers 66, 67 apart to receive the log therebetween, such elevation of the elevator platform 9, as will be seen, resulting in swinging the upper log-feeding rollers 66 of the pairs away from the lower log-feeding rollers 67 through upward thrust of the links 74 against the levers 71. After the log L has been entered between the log-feeding rollers 66, 67 at the rear side of the machine, the pneumatic jacks 25, 26 may be exhausted of air to permit the upper rollers 66 of the pairs 66, 67 to descend on the log. Obviously, then, the elevator platform 9 with all parts carried thereby will be suspended from the log L by the upper log-feeding rollers 66 and consequently said elevator platform 9 will rise and fall in correspondence with variations in diameter in the log L and sweeps, or bends, in said log. Before the log L has been entered between the log-feeding rollers 66, 67 at the rear side of the machine, the manual controls 163, 164 are set so as to permit the valves 148, 150 to close and exhaust the advancing cylinders 143, 144 of air, thereby permitting the retracting cylinders 133, 134 to swing the roughing and finishing cutter head carrying frames 51, 52 in a manner to retract the roughing and finishing cutter heads 53, 54 out of the path of movement of the log. As soon as the log-feeding rollers 66, 67 at the rear side of the machine have fed the log into the cutter head carrier 37 sufficiently, the manual controls 163, 164 may be set, or operated, to cause the advancing cylinders 143, 144 to swing said cutter head carrying frames 51, 52 toward the log L and thereby advance the roughing and finishing cutter heads 53, 54 against the log L. During this operation, the cutter head carrier may be power driven to rotate the same, in the manner already described, so that as said cutter heads 53, 54 are advanced into engagement with the log L, the same are rotated on their shafts 61, 62 and are simultaneously revolved around the log L by said cutter head carrier 37, in the manner already described. While engaging with said log, the roughing cutter head 53 breaks up the bark and knots on the oncoming log L, the finishing cutter 54 sequentially planing the log to a smooth finish. As the cutter head carrier 37 rises and falls in correspondence with variations in diameter in the log L and sweeps, or bends, in said log, said cutter heads 53, 54 are caused to correspondingly rise and fall and, under pressure in the advancing cylinders 143, 144 to operate concentrically around the log L throughout its length. By setting of the depth gage shoes 218 and 240, in the manner already described in the foregoing, the roughing and finishing cutter heads 53, 54 may be caused to cut to a predetermined minimum depth so that the roughing cutter head 53 acts more as a brush and breaker than a cutter and the finishing cutter head 54 planes the log without waste of the wood below the bark. By means of the described gimbals 192, 230 the roughing and finishing cutter heads 53, 54 may oscillate universally, laterally, to follow the curvature of sweeps, or bends, in the log L and debark and finish such sweeps, or bends, to a uniform depth. Obviously, advancing pressure on the roughing and finishing cutter head frames 51, 52 may be varied, as required, in accordance with the taper in the log. The described construction of the roughing cutter head 53 provides for easy and quick removal and replacement of teeth 84 and the construction of the finishing cutter head 54 is likewise advantageous in providing for easy removal and replacement of the cutter blades 235.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. In combination, a power driven annular rotary cutter-head carrier, a mounting for said carrier vertically adjustable to correspondingly adjust said carrier, means to feed a log longitudinally through the carrier, a pair of cutter-heads rotatably mounted inside said carrier to revolve around the log in rotary engagement therewith and for rotation relative to said carrier while revolving and being staggered longitudinally of the axis of said carrier to operate one in advance of the other on a log fed through the carrier, means responsive to variations in diameter of the log being fed and sweeps therein to adjust said mounting and thereby maintain said cutter-heads revolving concentrically of the log, means operative by rotation of said cutter-head carrier to rotate said cutter-heads while being revolved, means revolving with said carrier and operative to vary the cutting depth of at least one of said cutter-heads, and pressure responsive means for operating said last named means while the latter is revolving and including a stationary control.

2. In combination, a power driven annular rotary cutter-head carrier, a vertically shiftable housing carrying laterally extending platforms and having front and rear cheek plates with coaxial cylindrical throat members on which said carrier is journalled to rotate concentrically thereof, means to guide said housing for vertical movement, means comprising a pair of log-riding rollers for feeding a log through said throats and carrier, cutter-heads mounted on said carrier so as to engage the log and so as to be revolved around the log by the carrier, and means responsive to variations in diameter of the log being fed and to sweeps therein to vertically move said housing and thereby maintain said cutter-heads revolving concentrically of the log, said last named means comprising pairs of levers positioned at opposite side of the housing, each lever being pivoted at one end to said housing guide means, and pivoted at an intermediate point to one end of a link which has its opposite end pivotally connected to that platform adjacent thereto, one of said log-riding rollers being journaled in the other ends of a corresponding pair of said levers.

3. In combination, a power driven annular rotary cutter-head carrier, means to feed a log longitudinally through said carrier, cutter-heads, means to mount said cutter-heads on said carrier so that said cutter-heads will be revolved around the log by said carrier, and said means being swingably operative to advance and retract the cutter-heads into and from engagement with the log, fluid pressure means mounted on, and revolving with, said carrier, and engaging said swingable means to effect swinging movement thereof, a stationary control panel, and means mounted on said stationary panel and operatively connected to said fluid pressure means for controlling said fluid pressure means from said panel while the fluid pressure means is revolving.

4. In combination, a power driven annular rotary cutter-head carrier, means to feed a log longitudinally through said carrier, cutter-heads, means to mount said cutter-heads on said carrier so that said cutter-heads will be revolved around the log by said carrier and said means being swingably operative to advance and retract said heads into and out of engagement with the log, pneumatic means mounted on said carrier and engaging said swingable means to effect swinging movement thereof, said pneumatic means revolving with said carrier, and hydraulic means for controlling said pneumatic means, while the latter is revolving, said hydraulic means including a revolving portion mounted on said carrier, and a stationary portion comprising a control panel and operable controls on said panel.

5. In combination, a power driven annular rotary cutter-head carrier, means to feed a log longitudinally through said carrier, frames revolved around the log by said carrier, said frames being pivoted on the carrier for to and fro swinging movement relative to the log, cutter-heads mounted on said frames and movable into and out of engagement with said log by said to and fro movement of said frames, respectively, pneumatic means mounted on said carrier and revolving therewith and engaging said frames to normally retract said frames, other pneumatic means mounted on said carrier and revolving therewith and advancing said frames in opposition to the normally retracting means, and means for controlling the last-mentioned pneumatic means, while the latter is revolving, said controlling means including a revolving portion mounted on said carrier, and a stationary portion comprising operable controls.

6. In combination, an annular rotary cutter-head carrier, means to feed a log longitudinally through said carrier, frames revolved around the log by said carrier, said frames being pivoted on the carrier for to and fro swinging movement relative to said log, cutter-heads mounted on said frames and movable into and out of engagement with said log by said to and fro movement of said frames, respectively, pressure applying means mounted on said carrier and rotating therewith and engaging said frames to normally retract said frames, pneumatic means mounted on said carrier and revolving therewith and advancing said frames in opposition to said pressure applying means, and hydraulic pressure applying means for controlling said pneumatic means, while the latter is revolving, said hydraulic means rotating in part with said carrier and being stationary in part relative to the carrier and including a stationarily mounted control member.

7. In combination, an annular rotary cutter-head carrier, means to feed a log longitudinally through said carrier, frames revolved around the log by said carrier, said frames being pivoted on the carrier for swinging movement toward said log, cutter-heads mounted on said frames and movable into engagement with said log by said swinging movement, pneumatic means mounted on said carrier and revolving therewith and engaging said frames so as to effect said swinging movement, and hydraulic pressure-applying means for controlling said pneumatic means, while the latter is revolving, said hydraulic pressure-applying means including a revolving portion mounted on said carrier and stationarily mounted control members.

8. In combination, an annular rotary cutter-head carrier, means to feed a log longitudinally through said carrier, frames revolved around said log by said carrier, said frames being pivoted on said carrier for swinging movement toward said log, cutter-heads mounted on said frames and movable into engagement with said log by said swinging movement, pneumatic means mounted on said carrier and revolved therewith and engaging said frames, so as to effect said swinging movement, said pneumatic means including an air control valve, and hydraulic pressure-applying means for operating said valve, while the latter is revolving, said hydraulic pressure-applying means including a revolving portion mounted on said carrier and communicating with said valve, and stationarily mounted control members.

9. In combination, an annular rotary cutter-head carrier, means to feed a log longitudinally through said carrier, frames revolved around said log by said carrier, said frames being pivoted on said carrier for swinging movement toward said log, cutter-heads mounted on said frames and movable into engagement with said log by said swinging movement, pneumatic means mounted on said carrier and revolving therewith and engaging said frames, so as to effect said swinging movement, said pneumatic means including an air storage tank, cylinders supplied with compressed air from said tank and having pistons operatively connected to said frames, an air compressor operated by rotation of said carrier, and means for controlling the supply of air to said cylinders, while said pneumatic means is revolving, and including a revolving portion mounted on said carrier and stationarily mounted controls positioned at one side of said carrier.

10. In combination, an annular rotary cutter-head carrier, means for feeding a log longitudinally through said carrier, frames revolved around the log by said carrier, said frames being pivoted on said carrier for swinging movement toward said log, cutter-heads mounted on said frames and movable into engagement with said log by said swinging movement, pneumatic means mounted on said carrier and revolving therewith and engaging said frames, so as to effect said swinging movement, and hydraulic means for controlling said pneumatic means, while the latter is revolving, and including an annular fluid containing member fast on said carrier and rotating therewith, an annular fixed fluid container member opposed to said rotary annular member, stationarily mounted controls operative to exert fluid pressure in said annular fixed member, means operative by such fluid pressure to exert fluid pressure in said rotary annular member, and means operative by fluid pressure in said rotary annular member to render the pneumatic means effective.

11. In combination, an annular rotary cutter-head carrier, means to feed a log longitudinally through said carrier, cutter-heads, means to mount said cutter-heads on said carrier so as to be revolved thereby around the log and so as to advance and retract relative to said log, pneumatic means mounted on said carrier and revolved therewith and engaging said cutter-heads so as to advance said heads, and hydraulic means for controlling said pneumatic means, while the latter is revolving, and including an annular fluid containing member fast on said carrier and rotating therewith, an annular fixed fluid containing member opposed to said rotating annular member, stationarily mounted controls operative to exert fluid pressure in said fixed annular member, and means operative by such pressure in said fixed annular member to exert fluid pressure in said rotating annular member so as to render the pneumatic means effective.

12. In combination, a power driven rotary cutter-head carrier, means to feed a log longitudinally through said carrier, cutter-heads, means to mount said cutter-heads on said carrier so that said cutter-heads will be revolved around the log by said carrier and said means being swingably operative to advance and retract said heads into and out of engagement with said log, depth gage means for said cutter-heads carried by said swingable means and revolving therewith in engagement with said log and adjustable to move said swingable means away from the log to vary the cutting depths of the cutter-heads, pneumatic means mounted on said carrier and engaging said swingable means to effect swinging movement thereof, said pneumatic means revolving with said carrier, pneumatic means on at least one of said swingable means for adjusting said depth means, and hydraulic means for controlling both pneumatic means while the latter are revolving, said hydraulic means including a revolving portion mounted on said carrier, and a stationary portion comprising a control panel having operable controls thereon.

13. The combination according to claim 12, wherein said depth gage means comprises log-engaging shoes.

14. In combination, a power driven rotary cutter-head carrier, means to feed a log longitudinally through said carrier, a cutter-head, pivoted means swingably mounting said cutter-head on said carrier for revolving therewith and to advance and retract said cutter-head into and out of engagement with said log, depth gage means for said cutter-head carried by said pivoted means for revolving therewith and adjustable to retract said pivoted means to vary the cutting depth of said cutter-head, pneumatic means on at least one of said pivoted means for adjusting said depth gage means, and hydraulic means for controlling said pneumatic means and including a revolving portion mounted on said carrier, and a stationary portion comprising a control panel having a control thereon.

WILLIAM R. WHITLOCK.

REFERENCES CITED

The following references are of record in the file of this patent:

UNITED STATES PATENTS

| Number | Name | Date |
|---|---|---|
| 1,943,649 | White et al. | Jan. 16, 1934 |
| 2,109,414 | Deiters et al. | Feb. 22, 1938 |
| 2,109,415 | Deiters | Feb. 22, 1938 |
| 2,473,461 | White | June 14, 1949 |
| 2,477,922 | Emery et al. | Aug. 2, 1949 |

FOREIGN PATENTS

| Number | Country | Date |
|---|---|---|
| 39,704 | Sweden | Dec. 1, 1915 |
| 41,554 | Sweden | Nov. 8, 1916 |
| 67,469 | Sweden | June 4, 1929 |